(12) United States Patent
Sokolow

(10) Patent No.: US 12,420,884 B2
(45) Date of Patent: Sep. 23, 2025

(54) VEHICLE HANDLE SAFETY DEVICE CONTROL SYSTEM AND METHOD

(71) Applicant: Pandro Sokolow, Santa Monica, CA (US)

(72) Inventor: Pandro Sokolow, Santa Monica, CA (US)

( * ) Notice: Subject to any disclaimer, the term of this patent is extended or adjusted under 35 U.S.C. 154(b) by 164 days.

(21) Appl. No.: 17/461,788

(22) Filed: Aug. 30, 2021

(65) Prior Publication Data

US 2022/0063750 A1 Mar. 3, 2022

Related U.S. Application Data

(60) Provisional application No. 63/071,866, filed on Aug. 28, 2020.

(51) Int. Cl.
| | |
|---|---|
| *B62J 50/22* | (2020.01) |
| *B62J 43/20* | (2020.01) |
| *B62J 43/30* | (2020.01) |
| *B62J 45/00* | (2020.01) |
| *B62J 45/10* | (2020.01) |

(Continued)

(52) U.S. Cl.
CPC ............... *B62J 50/22* (2020.02); *B62J 43/20* (2020.02); *B62J 43/30* (2020.02); *B62J 45/00* (2020.02); *B62J 45/10* (2020.02); *B62J 45/41* (2020.02); *B62K 21/26* (2013.01); *B62K 23/02* (2013.01); *G08B 3/10* (2013.01); *H04R 1/025* (2013.01); *H04R 1/026* (2013.01); *H04R 3/00* (2013.01); *H04R 2499/13* (2013.01)

(58) Field of Classification Search
CPC ... B62J 50/22; B62J 43/20; B62J 43/30; B62J 45/00; B62J 45/10; B62J 45/41; B62J 3/12; B62K 21/26; B62K 23/02; B62K 11/14; G08B 3/10; H04R 1/025; H04R 1/026; H04R 3/00; H04R 2499/13; B62L 3/00
USPC .......................................................... 340/432
See application file for complete search history.

(56) References Cited

U.S. PATENT DOCUMENTS

| | | |
|---|---|---|
| 4,222,040 A | 9/1980 | Benson et al. |
| 5,083,108 A | 1/1992 | Guest |

(Continued)

FOREIGN PATENT DOCUMENTS

| | | | | |
|---|---|---|---|---|
| CN | 204452687 U | | 7/2015 | |
| GB | 2494124 A | * | 3/2013 | ............. B62J 11/00 |

(Continued)

OTHER PUBLICATIONS

Bike Forums.net, Car Horn Installation, retrieved from https://www.bikeforums.net/commuting/370869-car-horn-installation.html. Nov. 2005.

(Continued)

*Primary Examiner* — Omar Casillashernandez
(74) *Attorney, Agent, or Firm* — The Roy Gross Law Firm, LLC; Roy D. Gross

(57) ABSTRACT

A vehicle control handle safety device control which may be activated without the disengagement of a finger or thumb of a user from the vehicle control handle allowing a user to maintain a full hand grip on the vehicle control handle itself while concurrently activating the safety device control. In particular, the present invention relates to safety control device which is affixed or connects to a vehicle control handle grip such as that of a bicycle or other such similar conveyance or vehicle.

12 Claims, 9 Drawing Sheets

(51) Int. Cl.
*B62J 45/41* (2020.01)
*B62K 21/26* (2006.01)
*B62K 23/02* (2006.01)
*G08B 3/10* (2006.01)
*H04R 1/02* (2006.01)
*H04R 3/00* (2006.01)

(56) References Cited

U.S. PATENT DOCUMENTS

| | | | |
|---|---|---|---|
| 5,262,757 A | 11/1993 | Hansen | |
| 5,617,303 A | 4/1997 | Izzo, Sr. | |
| 5,857,061 A * | 1/1999 | Chang | E05F 15/695 49/140 |
| 6,216,060 B1 * | 4/2001 | Kishimoto | G01C 22/002 340/432 |
| 7,479,611 B1 * | 1/2009 | Robson | H01H 23/141 200/330 |
| 8,493,194 B1 | 7/2013 | Shoolman | |
| 9,079,533 B2 | 7/2015 | Pottier et al. | |
| 10,442,483 B2 | 10/2019 | Xing | |
| 2006/0285343 A1 * | 12/2006 | Okajima | B62J 6/015 362/473 |
| 2008/0047388 A1 * | 2/2008 | Lachance | B62K 23/04 74/491 |
| 2008/0114519 A1 * | 5/2008 | DuFaux | B60T 7/16 701/70 |
| 2008/0271962 A1 * | 11/2008 | Kelsen | B62K 23/06 188/24.18 |
| 2009/0102627 A1 * | 4/2009 | Russell | B62J 6/056 340/432 |
| 2012/0283894 A1 * | 11/2012 | Naboulsi | G08B 21/06 701/1 |
| 2021/0120905 A1 * | 4/2021 | Burry | A61F 9/029 |
| 2021/0179223 A1 * | 6/2021 | Charalampous | B62J 45/20 |
| 2021/0347425 A1 * | 11/2021 | Vianello | B62J 45/20 |
| 2022/0126948 A1 * | 4/2022 | Kruisselbrink | B62J 43/20 |

FOREIGN PATENT DOCUMENTS

| | | |
|---|---|---|
| GB | 2545255 A | 6/2017 |
| WO | 2012100289 A1 | 8/2012 |

OTHER PUBLICATIONS

Youtube.com, Anoying people with a car horn on my bicycle, retrieved from https://www.youtube.com/watch?v=Vm6HoOOous4. May 29, 2008.
Bike Forums.net, Electronics, Lighting, & Gadgets, Best, smallest, and loudest electronic horn. retrieved from https://www.bikeforums.net/electronics-lighting-gadgets/360349-best-smallest-loudest-eletronic-horn.html. Nov. 2007-Dec. 2008.
Youtube.com, Bicycle Lights and Horn sounds, retrieved from https://www.youtube.com/watch?v=mQ8Ur75e3HU. Mar. 6, 2012.
Youtube.com, BikeBell—Almost Real Bike Bell App for Symbian, Retrieved from https://www.youtube.com/watch?v=XA8ITP2ifNU. Oct. 3, 2010.
Bike Forums.net,Car horn Installation retrieved from https://www.bikeforums.net/commuting/370869-car-horn-installation.html.
WOLO-mfg.com, Electric horns, retrieved from http:/web.archive.org/web/19970214110300/http:/www.wolo-mfg.com/elec.htm.
Instructables.com,Putting a car horn on your bicycle!, Retrieved from https://www.instructables.com/Putting-A-Car-Horn-On-Your-Bicycle/, Quotes from comments dated May 10, 2009. Published Oct. 19, 2008.
Manta.com,WOLO Manufacturing Corp, retrieved from https://www.manta.com/c/mmf0hy9/wolo-manufacturing-corp.
Kickstarter.com, Loud Bicycle: Car horn for your bike, Retrieved from https://www.kickstarter.com/projects/lansey/loud-bicycle-car-hors-for-cyclists. Nov. 7, 2015.
Bikeforums.net, Electronics, Lighting, & Gadgets, Total Geekiness, https://www.bikeforums.net/electronics-lighting-gadgets/42629-total-geekiness-21.html.

* cited by examiner

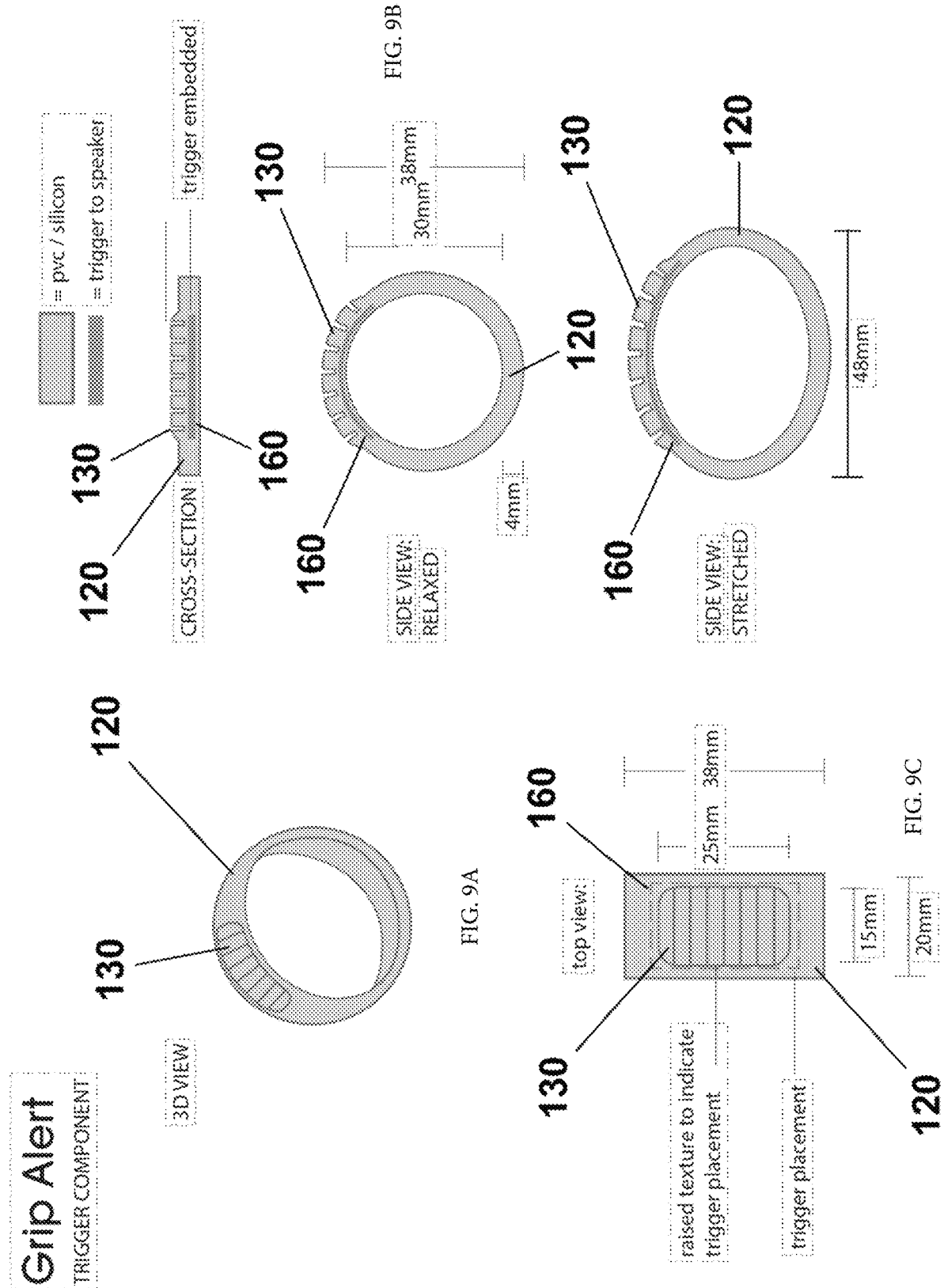

VEHICLE HANDLE SAFETY DEVICE CONTROL SYSTEM AND METHOD

CROSS REFERENCE TO RELATED APPLICATIONS

The present application claims priority to U.S. Provisional Patent Application Ser. No. 63/071,866, filed Aug. 28, 2020, entitled SAFEGRIPS DEVICE. The contents of this application are herein incorporated by reference in its entirety.

FIELD OF THE INVENTION

The present invention is directed to a vehicle control handle safety device control which may be activated without the disengagement of a finger or thumb of a user from the vehicle control handle; thus, allowing a user to maintain a full hand grip on the vehicle control handle itself while concurrently activating the safety device control.

In particular, the present invention relates to a safety control device which is affixed or connects to a vehicle control handle grip such as that of a bicycle or other such similar conveyance or vehicle.

BACKGROUND OF THE INVENTION

Traditional and known "bicycle horn", "bicycle bell", and "bicycle light" options require moving one's thumb to depress a button or other such lever or activator. This requires at least in partial loosening of one's grip on a vehicle control handle; and many times, requiring a vehicle user to look down at the grip/button/lever to ensure correct placement of a thumb or finger at a correct location for safety device activation.

In some known related systems; some vehicle control handles, such as motorcycle grips, include a "rotary throttle" and may include other controls such as lights on/off, turn signals, and the like. In like manner; some human power-driven bicycles include a "rotary gear shift" integrated into a handle-bar grip.

All these known systems require a user in some manner, to fully or partially disengage their grip on a vehicle control handle to activate a button or lever which either mechanically or electronically engages or disengages a control or safety system. Such systems may be as simple as a lever activated mechanical bell affixed to a handlebar; or as complex as the rotary throttle or gear shift previously described.

Regardless, known systems require the loosening of one's hand grip to activate a control and/or safety system; of which creates safety and performance disadvantages for the vehicle user; and, in many cases those around the vehicle user.

SUMMARY OF THE INVENTION

What is desired is a method and system to control a vehicle safety system from a vehicle control handle which allows a user to maintain a full grip upon the vehicle control handle itself.

It is an object of the instant invention to provide an activation system for a control or safety system of a vehicle, the activation system comprising; a switch secured between a vehicle control handle and the hand of a vehicle user; whereby when a vehicle user engages the switch the activation system enables and/or disables a vehicle control or safety system; the activation system being integral or affixed to the vehicle control handle.

It is an object of the instant invention, whereby the vehicle is a bicycle or motorcycle.

It is an object of the instant invention to provide an activation system wherein the switch is a pressure sensitive switch of a selected sensitivity which precludes unintentional engagement of the activation system during the intended use of the vehicle control handle.

In certain embodiments, engagement of the activation system involves squeezing the pressure sensitive switch while the user's hand remains on the vehicle handlebar.

In certain embodiments, squeezing the pressure sensitive switch while the user's hand remains on the vehicle handlebar both triggers a speaker element as well as a brake.

It is an object of the instant invention to provide an activation system wherein the selected sensitivity is variable as selected by a user in the field.

It is an object of the instant invention to provide an activation system wherein the activation system is resistant to water intrusion.

It is an object of the instant invention to provide an activation system wherein the switch is positioned under or within an elastic band including tactical indicia of an activation area on the elastic band to facilitate intentional user activation and mitigate unintentional user activation.

It is an object of the instant invention to provide an activation system wherein the switch is a hall effect magnetic switch activated by a magnet or magnetic field conductive material worn by a system user which when placed in sufficient proximity to the hall effect magnetic switch activates the hall effect switch to enable or disable a control or safety system of a vehicle.

It is an object of the instant invention to provide an activation system wherein the activation system is integral to the vehicle control handle.

It is an object of the instant invention to provide an activation system wherein the activation system comprises a kit for aftermarket installation on an existing vehicle control handle.

It is an object of the instant invention to provide an activation system wherein the activation system is electronic and powered by a replaceable battery.

It is an object of the instant invention to provide an activation system wherein the activation system is electronic and powered by a battery which charge is maintained by a photovoltaic cell.

It is an object of the instant invention to provide an activation system wherein the activation system is electronic and in wired communication with a vehicle control or safety system.

It is an object of the instant invention to provide an activation system wherein the activation system is electronic and in wireless communication with a vehicle control or safety system.

It is an object of the instant invention to provide an activation system wherein the activation system enables and disables an audio and or visible warning indica.

It is an object of the instant invention to provide an activation method of vehicle control or safety system activation, the method comprising the steps of; providing and securing a switch between a vehicle control handle and the hand of a vehicle user; whereby when a vehicle user engages the switch the activation system enables and/or disables a vehicle control or safety system; the activation system being integral or affixed to the vehicle control handle.

It is an object of the instant invention, whereby the vehicle is a bicycle or motorcycle.

It is an object of the instant invention to provide an activation method wherein the provided switch is a pressure sensitive switch of a selected sensitivity which precludes unintentional engagement of the activation system during the intended use of the vehicle control handle.

It is an object of the instant invention to provide an activation method wherein the selected sensitivity is variable as selected by a user in the field.

It is an object of the instant invention to provide an activation method wherein the provided switch is positioned under or within an elastic band including tactical indica of an activation area on the elastic band to facilitate intentional user activation and mitigate unintentional user activation.

It is an object of the instant invention to provide an activation method wherein the provided switch is a hall effect magnetic switch activated by a magnet or magnetic field conductive material worn by a system user which when placed in sufficient proximity to the hall effect magnetic switch activates the hall effect switch to enable or disable a control or safety system of a vehicle.

It is an object of the instant invention to provide an activation method wherein the provided activation system is integral to the vehicle control handle.

It is an object of the instant invention to provide an activation method wherein the provided activation system comprises a kit for aftermarket installation on an existing vehicle control handle.

It is an object of the instant invention to provide an activation method wherein the provided activation system is electronic and powered by a replaceable battery.

It is an object of the instant invention to provide an activation method wherein the provided activation system is electronic and powered by a battery which charge is maintained by a photovoltaic cell.

It is an object of the instant invention to provide an activation method wherein the provided activation system is electronic and in wired communication with a vehicle control or safety system.

It is an object of the instant invention to provide an activation method wherein the provided activation system is electronic and in wireless communication with a vehicle control or safety system.

It is an object of the instant invention to provide an activation method wherein the provided activation system enables and disables an audio and or visible warning indica.

It is an object of the instant invention to provide a vehicle warning system, comprising: an elastic band comprising: a speaker component, and a trigger component having a switch, wherein the elastic band is integral or affixed to a handlebar on the vehicle, wherein when a user engages the switch, the speaker is enabled and provides a warning sound, and wherein the user is able to engage the switch without removing the user's hand from the handlebar.

In certain embodiments, the engagement of the switch involves the user squeezing the handlebar.

Other objects of the invention and its particular features and advantages will become more apparent from consideration of the following drawings and accompanying detailed description. It should be understood that the detailed description and specific examples, while indicating the preferred embodiment of the invention, are intended for purposes of illustration only and are not intended to limit the scope of the invention.

BRIEF DESCRIPTION OF THE DRAWINGS

FIG. 9A-9C depicts orthogonal and cross-sectional depictions of an embodiment of instant invention.

DETAILED DESCRIPTION OF THE INVENTION

As depicted in FIG. 1 through FIG. 4, the inventive system and method provides an activation system (100) either integral or affixed to a vehicle control handle (110).

Figure 1:
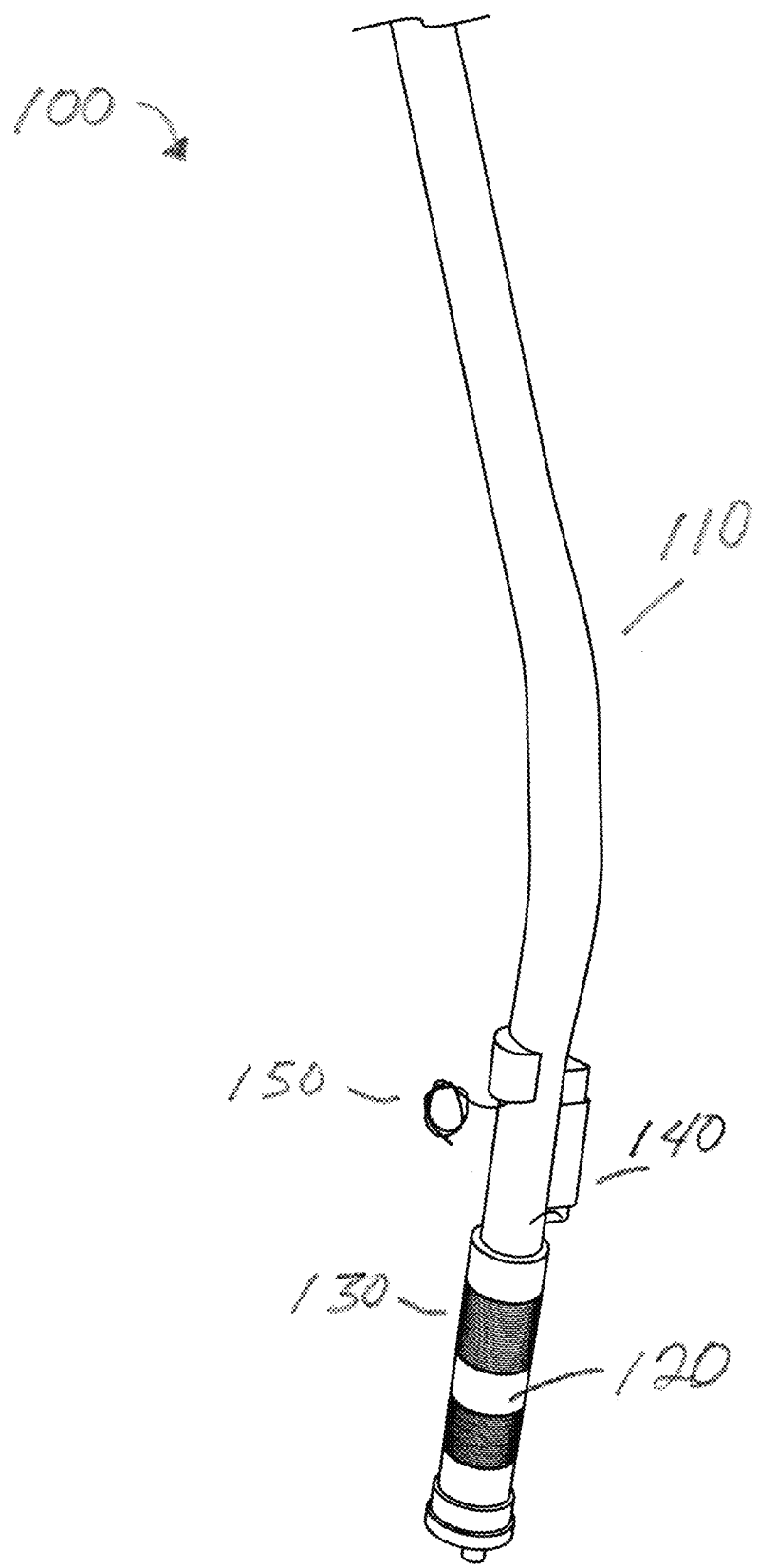
FIGS. 1-4 depict an embodiment of the invention.
Figure 2:
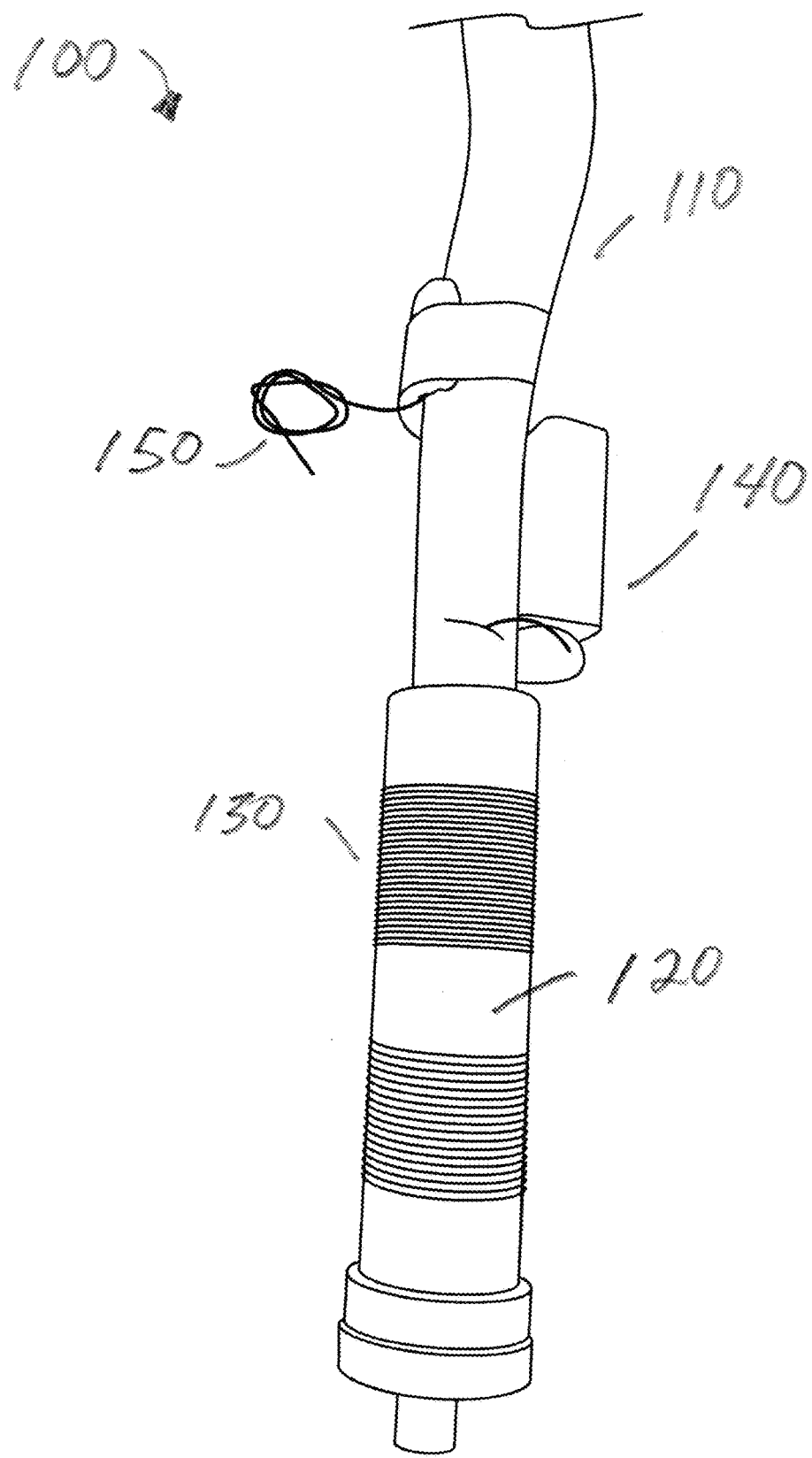
Figure 3:
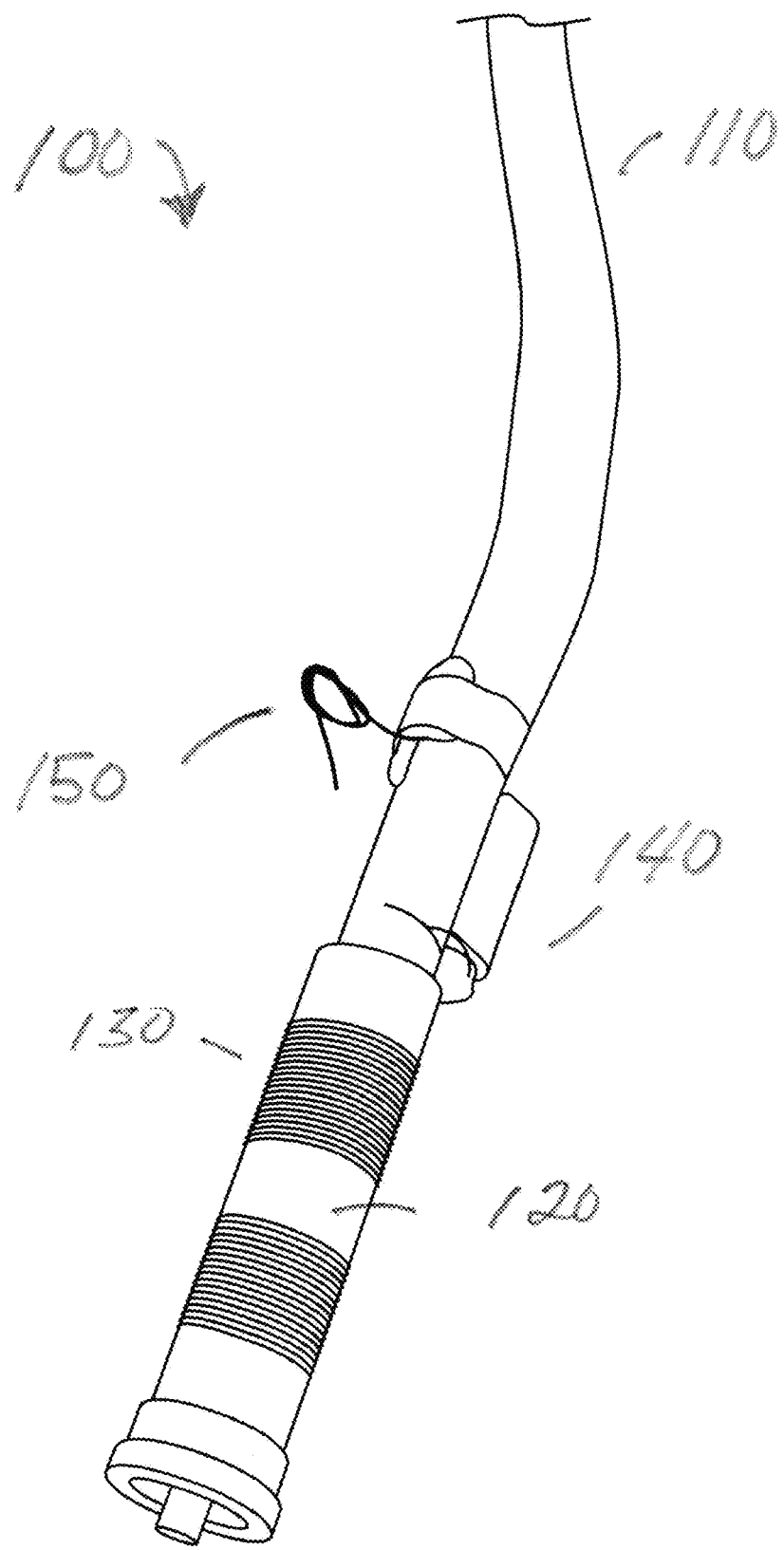
Figure 4:
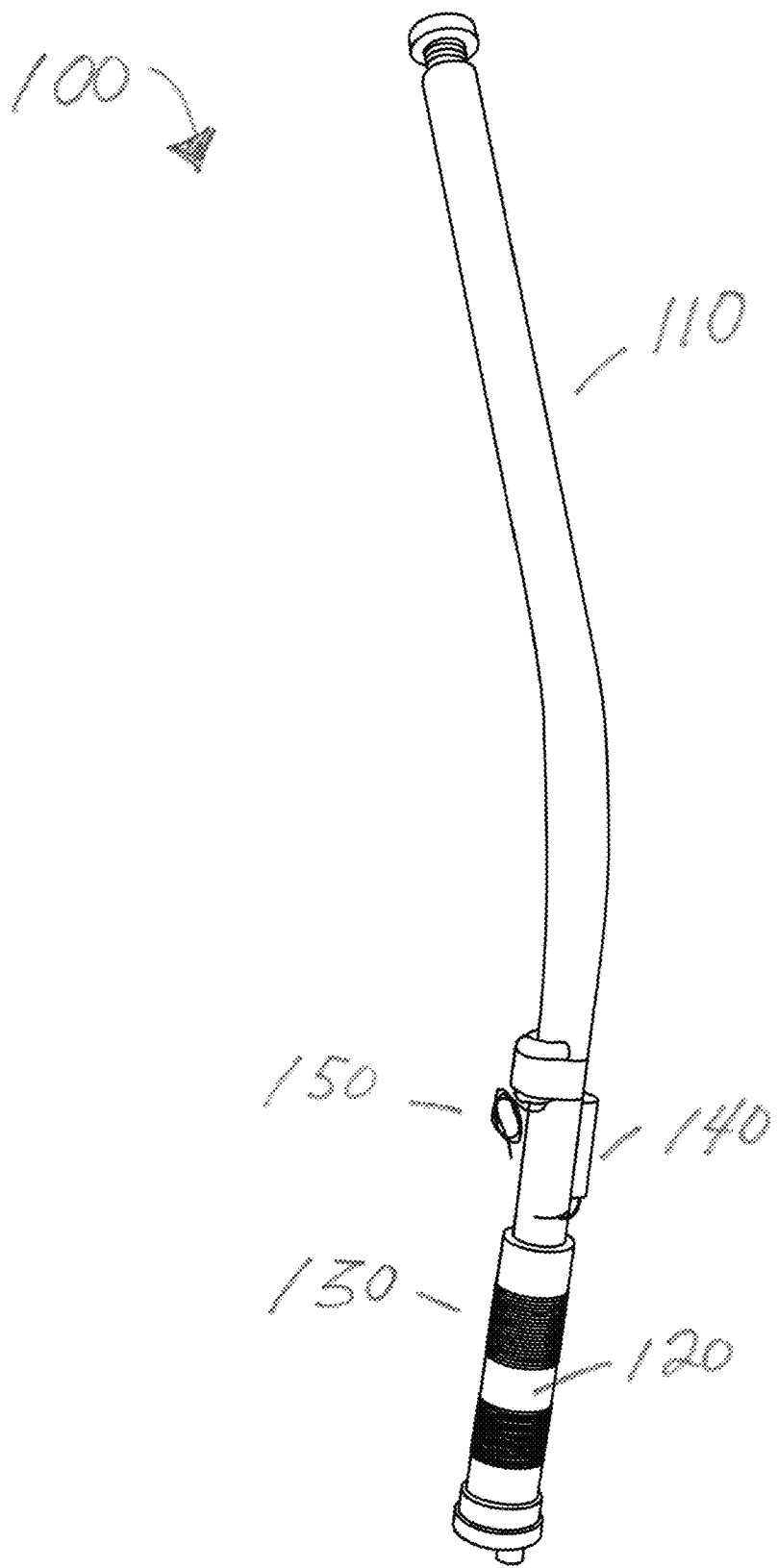
Figure 5:
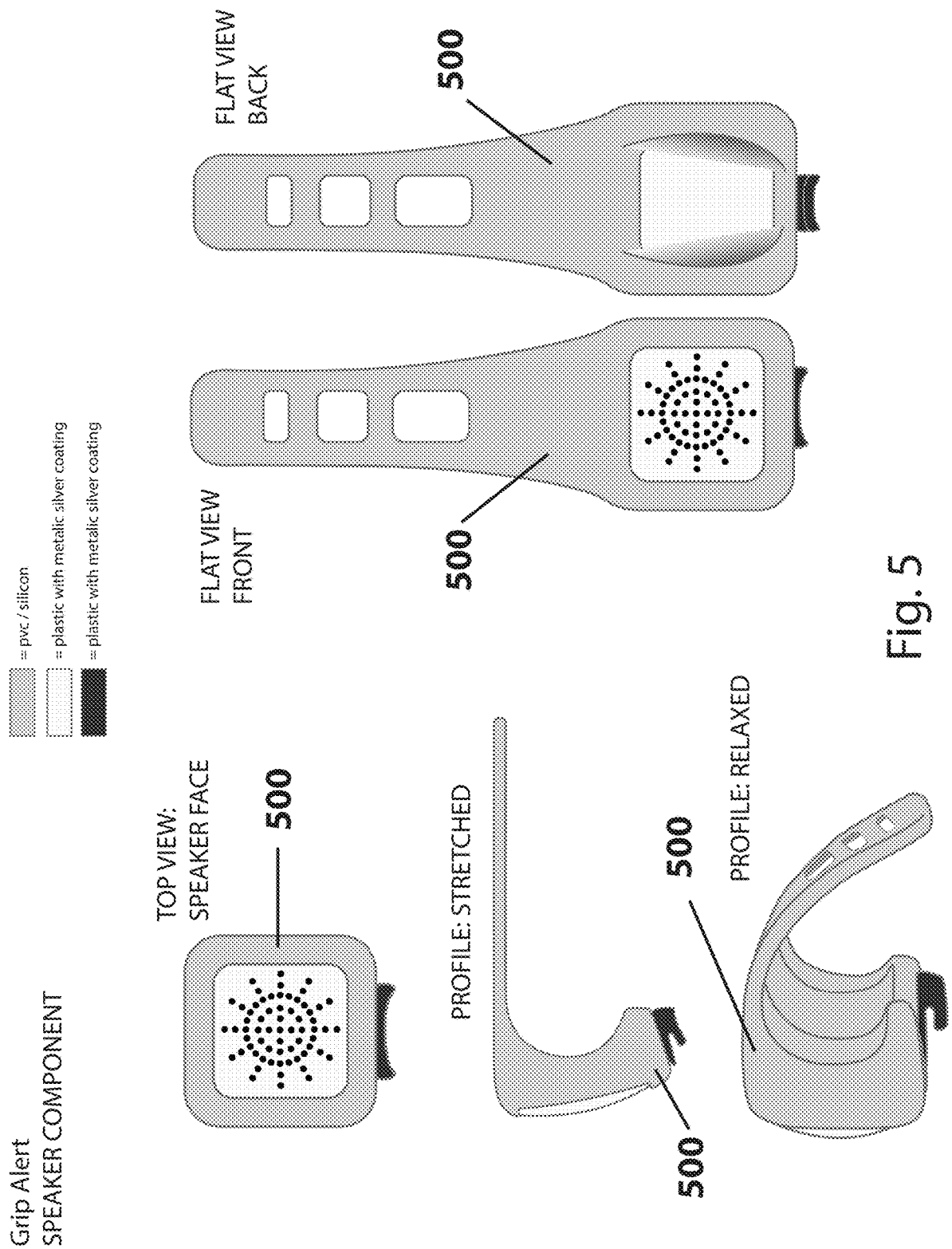
FIG. 5 depicts orthogonal depictions of an embodiment of an audio indica aspect of the instant invention.

The activation system (100) may embody an elastic or semi-elastic grip (120) integral to or affixed to (that is "slipped onto" the end of a ridged handlebar (110)) and powered by a battery (140) and in wireless communication (150) with a remotely located vehicle control or safety system such as depicted in FIG. 5 (or other such system or device not shown).

In certain embodiments, the battery is enclosed within the speaker device shown in FIG. 5. In certain embodiments, a replaceable or rechargeable battery is provided as well as a charging cable similar to charging a cellular phone to charge the speaker device.

It is contemplated that the grip (120) includes a battery (140) and a wireless communication (150) integral to interior of the activation system (100).

It is contemplated that the activation system may be affixed to end of a vehicle control handle via mechanical spiral threading or by mechanical clamp.

It is contemplated that the activation system grip (120) may include a switch or trigger (160) which when enabled, activates and/or controls a vehicle control or safety system. In certain embodiments, the vehicle control or safety system is a brake. In certain embodiments, the vehicle control or safety system is a horn or speaker.

It is contemplated that the activation grip (120) may include a tactile indica (130) such as a raised and/or indented texture to provide feedback to a system user the placement of a switch (160) embedded within or underneath the grip (120).

It is contemplated that the switch is a pressure switch which when sufficient force is applied by a user the switch is either engaged or disengaged.

It is contemplated that the switch 160) is a deformation switch in which when the grip (120) is deformed to a sufficient extent wherein the switch when deformed is either engaged or disengaged.

It is contemplated that the switch (160) is a hall effect magnetic switch in which when a magnet or magnetic conductive material is worn by a system user and when brought into sufficient proximity of the switch (16) either engages or disengages the switch (160).

As depicted in FIG. 5; the activation system (100) may be in communication with an safety or warning audio indica system (500) which may include an "electronic horn" and/or a warning, safety; and/or a headlight capability.

In certain embodiments, the warning audio indica system (500) shown in FIG. 5 is made from pvc/silicone, plastic with metallic silver coating.

In certain embodiments, the warning audio indica system (500) or speaker component has a square speaker face and held in place with an elastic band connected with or integral to a vehicle handlebar.

Figure 6:
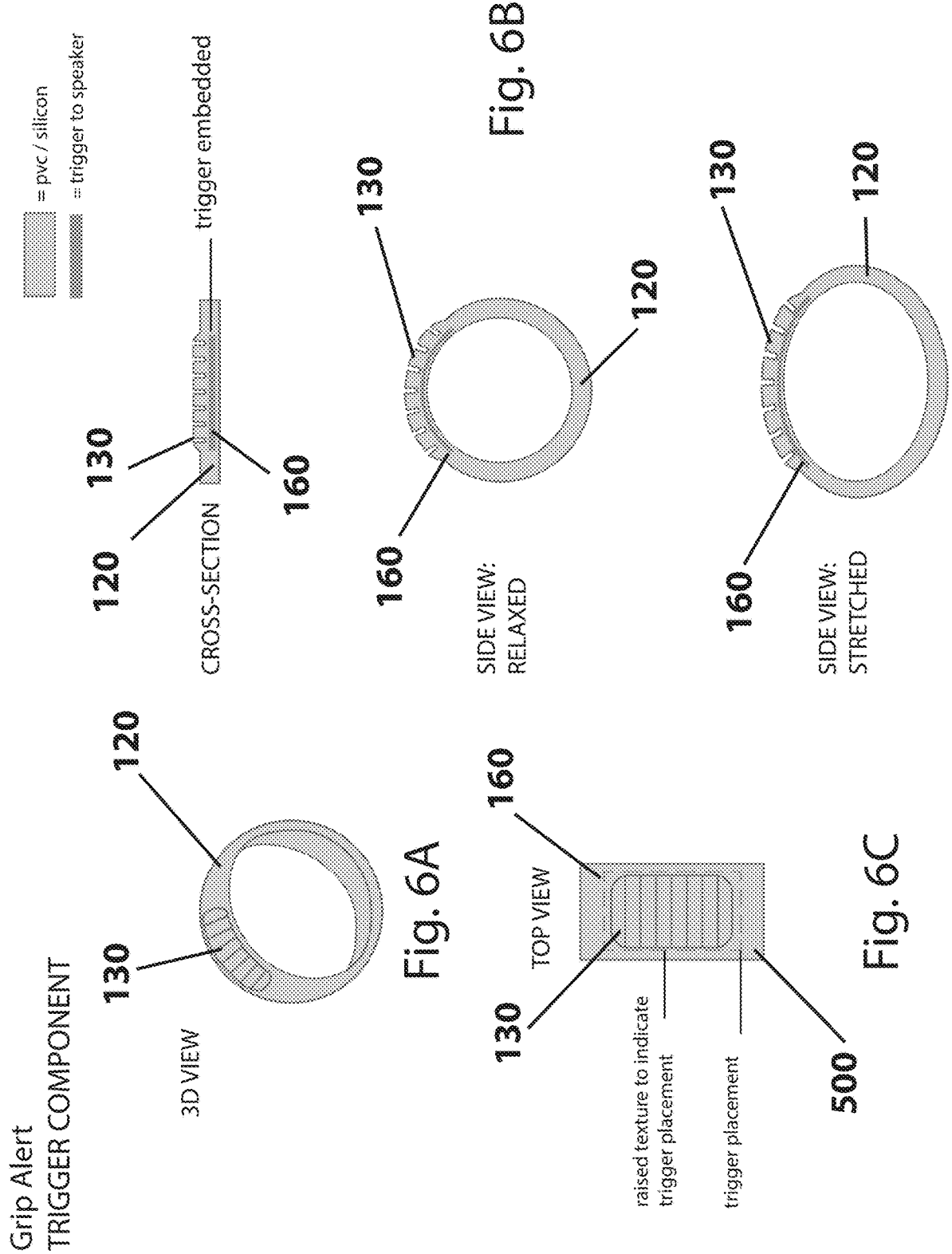
FIGS. 6A-6C depicts orthogonal and cross-sectional depictions of an embodiment of instant invention.

FIGS. 6A-6C shows the trigger component of the system (100). As shown in FIG. 6A, the activation grip (120) includes a tactile indica (130) whereby the tactile indica (130) has a raised texture to indicate trigger placement. As shown in FIG. 6B, a cross section, side view (relaxed) and side view (stretched) are shown. The activation grip (120) is shown being a band that is integral with a vehicle handlebar that can be installed on new vehicles (such as bicycles) or retrofit to existing vehicles.

Figure 7:
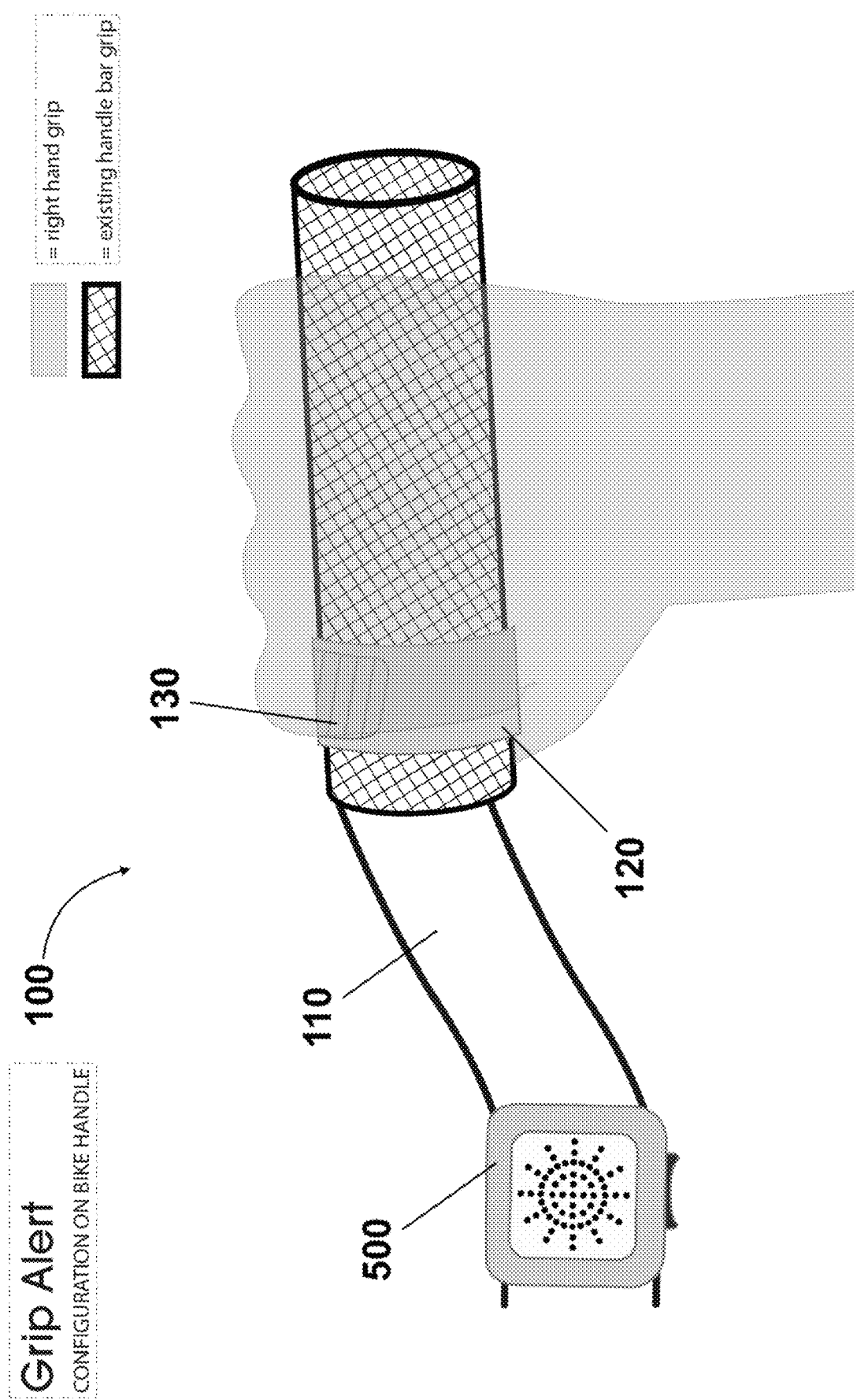
FIG. 7 shows an embodiment whereby the band is configured on a bicycle handlebar.

FIG. 7 shows an embodiment whereby the band is configured on a bicycle handlebar. In this embodiment, the activation grip (120) is shown on vehicle control handle (110).

Figure 8:
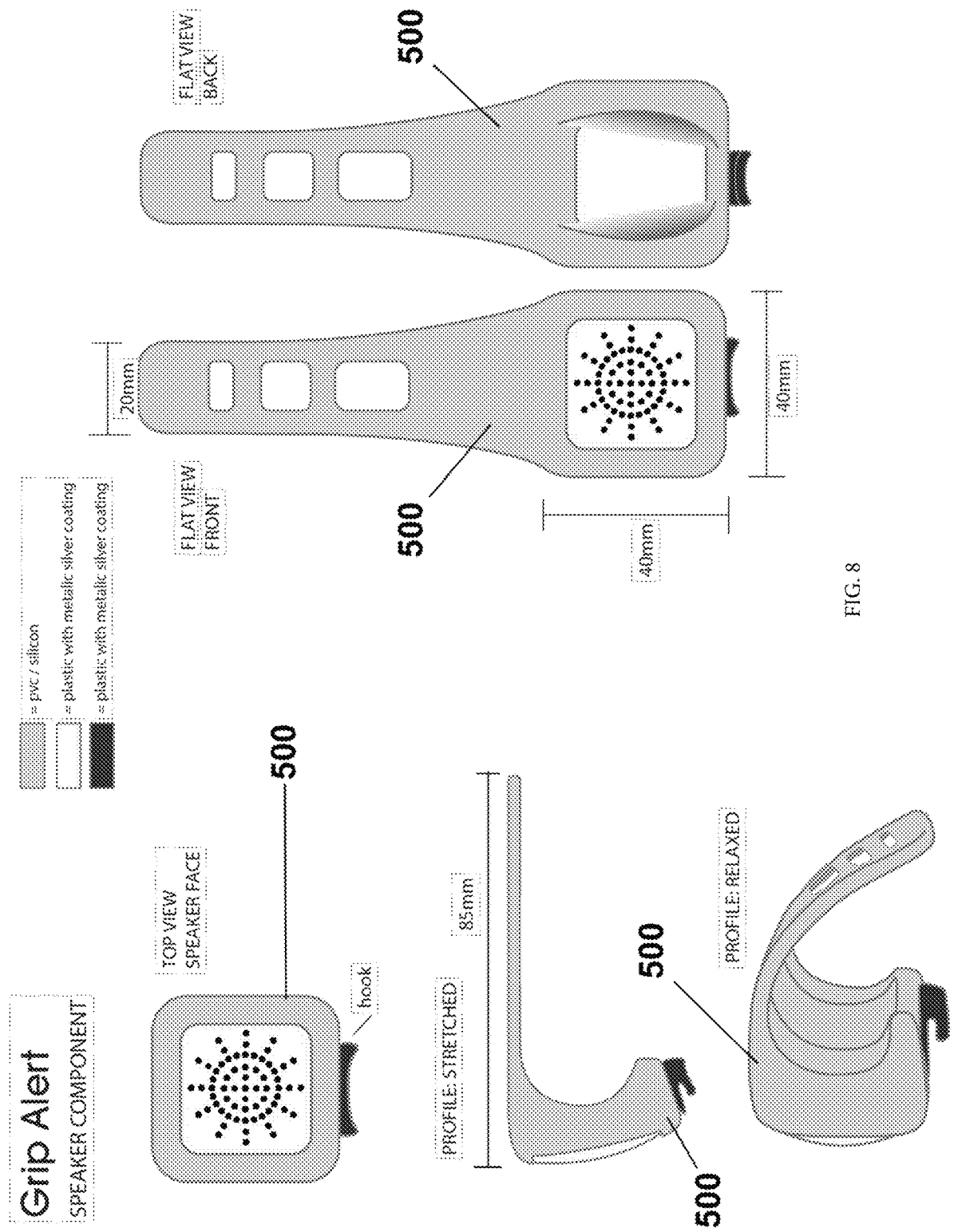
FIG. 8 depicts orthogonal depictions of an embodiment of an audio indica aspect of the instant invention.

FIG. 8 depicts orthogonal depictions of an embodiment of an audio indica aspect of the instant invention. In FIG. 8, the switch or trigger (160) which when enabled, activates and/or controls a vehicle control or safety system. In FIG. 8, the switch or trigger (160) includes a battery located within the switch or trigger (160).

FIGS. 9A-9C shows the trigger component of the system (100). As shown in FIG. 6A, the activation grip (120) includes a tactile indica (130) whereby the tactile indica (130) has a raised texture to indicate trigger placement. As shown in FIG. 9B, a cross section, side view (relaxed) and side view (stretched) are shown. The activation grip (120) is shown being a band that is integral with a vehicle handlebar that can be installed on new vehicles (such as bicycles) or retrofit to existing vehicles.

In certain embodiments, the trigger has a length of 25 mm and a width of 15 mm. in certain embodiments, the switch has a length of 38 mm and a width of 20 mm.

In certain embodiments, the band has a thickness of 4 mm. In certain embodiments, when stretch, the band has a diameter of 48 mm.

In certain embodiments, the band has a height of 30 mm and 38 mm in conjunction with the switch.

In certain embodiments, the band is made of pvc and silicone and has a trigger embedded within the band.

In certain embodiments, the band is portable.

In certain embodiments, the speaker has a square shape and has a height and width of 40 mm respectively.

In certain embodiments, the speaker is connected to an elastic band having a width of 20 mm, and a length of 85 mm when stretched.

In certain embodiments, the instant invention is directed to a combination horn/grip that connects to a handle bar. The grip has an integrated horn within the grip, so that you simply squeeze to make the horn sound. The horn/battery/switch are all integrated into the grip. Again, all four parts (horn/battery/switch/grip) all integrated into one grip.

In certain embodiments, a user simply squeeze to sound the horn, which is the likely natural reaction anyway. This grip can be used on a bicycle, scooter, motorcycle, moped (i.e. any device with grips).

In a certain embodiments, the grip is integrated into a handlebar.

In a certain embodiments, the grip is configured to be retrofit into an existing handlebar.

In a certain embodiments, the device has a wire connected to it, but without the grip. This would be used for road bikes, where you would typically roll grip tape on to your handlebars. This is a device (about 1"×1" and ¼" thick) that mounts to your handlebar and houses the battery and speaker. The wire, with a pressure switch at the end, is run to the "squeeze point" before installing the grip tape. Same concept while riding, simply squeeze to sound the horn.

Having thus described several embodiments for practicing the inventive method, its advantages and objectives can be understood. Variations from the drawings and description can be made by one skilled in the art without departing from the scope of the invention, which is to be determined from the following claims.

Accordingly, this invention is not to be limited by the embodiments as shown in the drawings and/or as described in the description, since these are given by way of example only and not by way of limitation.

What is claimed is:

1. A safety activation system for a vehicle selected from a group consisting of a bicycle or motorcycle, the safety activation system comprising;

a pressure sensitive switch secured to and integrated with a vehicle handlebar and configured to be actuated by the hand of a user, wherein when the user engages the pressure sensitive switch, the pressure sensitive switch activates the safety activation system;

an elastic band located on the vehicle control handlebar, the elastic band including tactical indica of an activation area, wherein the pressure activated switch is positioned under the activation area of the tactical indica; and a speaker located on the vehicle control handlebar and activated by the safety activation system, wherein the safety activation system is activated by the user applying pressure to the activation area of the elastic band by squeezing the handlebar with the grip of the user's palm and fingers, and thereby actuating the pressure sensitive switch, without moving the user's fingers and/or thumb from a first position on the vehicle handlebar, thereby allowing the user to maintain a full fingers and thumb grip on the vehicle handlebar itself while concurrently activating the safety device control while avoiding repositioning the user's hand, fingers, or thumb, wherein the pressure sensitive switch is of a selected sensitivity which precludes unintentional engagement of the activation system during the intended use of the vehicle control handlebar, and wherein the safety activation system causes the speaker to emit an alert warning sound.

2. The system of claim 1, wherein the selected sensitivity is variable as selected by a user.

3. The system of claim 1, wherein the activation system is resistant to water intrusion.

4. The system of claim 1, wherein the activation system comprises a kit for aftermarket installation on an existing vehicle control handlebar.

5. The system of claim 1, wherein the activation system is electronic and powered by a replaceable or nonreplaceable battery.

6. The system of claim 1, wherein the activation system is electronic and powered by a battery which charge is maintained by a photovoltaic cell.

7. The system of claim 1, wherein the activation system is electronic and in wired communication with a vehicle control or safety system.

8. The system of claim 1, wherein the activation system is electronic and in wireless communication with a vehicle control or safety system.

9. A method of vehicle control or safety system activation, the method comprising the steps of:

providing a safety activation system of claim 1;
engaging the pressure sensitive switch to enable and/or disable the vehicle control or safety system,
wherein the engagement of the switch occurs when the user maintains a full grip upon the vehicle control handlebar itself, thereby allowing the user to maintain a full fingers and thumb grip on the vehicle control handlebar itself while concurrently activating the safety device control.

10. The method of claim 9, wherein the pressure sensitive switch is of a selected sensitivity which precludes unintentional engagement of the activation system during the intended use of the vehicle control handlebar.

11. The method of claim 10, wherein the selected sensitivity is variable as selected by a user.

12. The system of claim 1, wherein the vehicle control system further triggers a brake element.

* * * * *